J. S. GILMORE.
Wheel-Cultivator.

No. 52,159.  Patented Jan 23, 1866.

WITNESSES:
Chas D Smith
Jos. L. Ewin

INVENTOR.
J. S. Gilmore
By Munn & Co.
Attorneys

UNITED STATES PATENT OFFICE.

JAMES S. GILMORE, OF MILLERSBURG, ILLINOIS.

IMPROVEMENT IN CULTIVATOR-PLOWS.

Specification forming part of Letters Patent No. 52,159, dated January 23, 1866.

*To all whom it may concern:*

Be it known that I, JAMES S. GILMORE, of Millersburg, in the county of Mercer and State of Illinois, have made new and useful Improvements in Cultivator-Plows; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1:
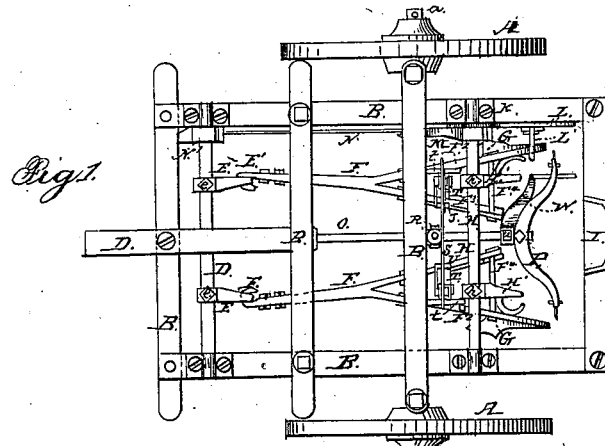
Figure 2:
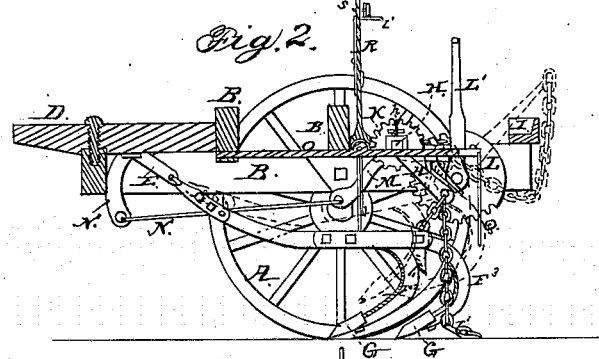
Figure 3:
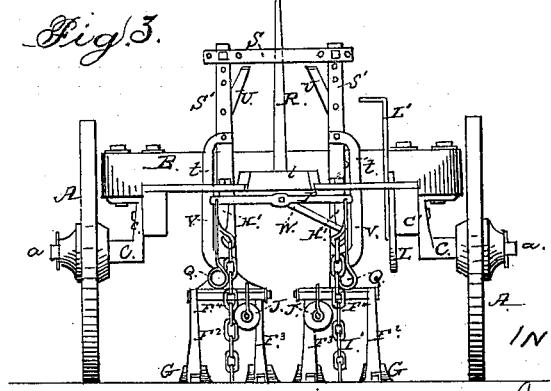

Figure 1 is a plan or top view. Fig. 2 is a longitudinal vertical central section. Fig. 3 is a rear elevation.

The improvement consists in the arrangement by which the pair of double shovels are lifted and shifted laterally and adjusted so as to work at any distance asunder.

In the accompanying drawings, A A represent the wheels of the machine, upon which the frame B B is mounted by means of the two short axles $a$ $a$, which are journaled in boxes C C formed on metallic brackets C' C'. The latter are bolted to the frame in the manner shown in Fig. 3. D may represent the tongue.

Near the front transverse bar of the frame is a square shaft, D, which is formed with a round journal at its center and one at each end, in order that the shaft may turn upon its axis in suitable bearings on the under side of the tongue and on the forward ends of the side bars of the frame.

E E are the clevises, the rear extremities of which have eyes to receive the hooks F' F' on the forward ends of the plow-shanks F F. These clevises E E are applied to the square shaft D by having square openings formed in their enlarged ends, which openings fit over the shaft, so that a movement of the shaft D upon its axis will produce the vibration of the clevises, the latter moving in a vertical plane. The openings in the ends of the clevises are large enough to permit the clevises to be adjusted laterally to any desired extent, and when so adjusted they may be detained by set-screws $e$ $e$. Each plow-shank F may properly be termed a "double shank," since it branches off at the rear into two arms or parts, F$^2$ F$^3$, the extremity of each of these arms being the point of attachment for one of the shovels, G. The whole shank may be made of one solid piece of iron split and bent into the form represented.

H is a square shaft located at the rear end of the machine, but in front of the driver's seat I, which is mounted on the hindermost transverse beam of the frame B. On this shaft H are fixed short arms or clevises H', whose construction, application, and mode of lateral adjustment correspond with those of the clevises E at the front of the machine, $h$ being the set-screws by which the clevises H' are retained in position when adjusted. Chains I' I' connect with the clevises H' H' and with pulleys J J, which are each placed under a round brace-bar, F$^4$, which is applied to the arms of the plow-shank, in the manner clearly shown in the drawings. The chains I' may be adjusted so as to vary the working position of the plow as occasion may require.

K is a cog-wheel keyed upon the shaft H near one end thereof, and working in connection with another cog-wheel, L, which is pivoted to the side piece of the frame B and provided with a lever, L', by which it may be rotated upon its axis. The partial rotation which the wheel K receives from the wheel L produces a like movement of the shaft H, and the pendants or clevises H' attached thereto are vibrated either upward or downward, according to the direction in which the lever L' is turned, and the plow-shanks, with the plows, are raised or lowered, as the case may be.

M is an arm fixed upon the shaft H alongside of the wheel K, and connected through a rod, N, with an arm, N', fixed upon the shaft D at the front end of the machine. The arms M N' are constructed and applied to the square shafts in the same manner as the arms E H'. Motion is communicated from the shaft H to the shaft D through the arms M N' and rod N, so that the arms E vibrate simultaneously with the arms H'; hence while the plow-shanks are lifted at the rear end by the arms H' they are lifted at the forward end by the arms E, as shown in red lines in Fig. 2. Any suitable permanent retaining device can be used to hold the lever L' in its depressed position to keep the plows raised when the machine is not in operation.

The preceding description relates principally to the devices by which the plows are raised and lowered simultaneously. I will now describe the devices whereby the plow-shanks are adjusted independently of each other.

O is a shaft extending backward from the rear end of the tongue D to a point near the driver's seat, and its bearings permit the said rod to turn freely. Upon the rear end of the shaft O is bolted a curved bar, P, to the extremities of which are attached two stirrups, Q Q, for the driver's feet. At a suitable point between the ends of the shaft O, and upon the latter, is attached an upright arm, R, which, from the rotary movement of the shaft O, receives a lateral vibratory movement. This upright arm R is confined within a staple, s, near its upper end, which staple is inserted in a bar, S, which is pivoted to and connects the upper ends of the uprights S' S'. The lower ends of the uprights S' S' are attached to the iron braces T T, one of which is inserted and secured between the arms $F^2$ $F^3$ of each of the plow-shanks F. Hence it will be seen that the depression of one of the stirrups Q by the foot of the driver vibrates the curved bar P, partially rotates the shaft O, vibrates the arm R, throws up one side of the bar S, and thus raises one of the uprights S' and the plow-shank to which it is attached without disturbing the working position of the other plow-shank.

U U are bent arms attached to the uprights S' S', and projecting beneath the bar S to limit the movement of the latter, and thus prevent the plows from being raised higher than might be expedient. Pins or studs $t$ $t$ occupy the spaces between the curved metal bars V V and the uprights S' S' and prevent the lateral displacement of the latter.

W represents a reversible lever, having an opening in one end to adapt it to fit upon the shaft O, to which it is made fast by means of a set-screw, $w$. The lever W may be applied in such a way as to hang below the shaft O and be used as a foot-lever, or it may be taken off and reapplied, so as to project above the shaft O, and be thus converted into a hand-lever.

Having thus described my invention, the following is what I claim as new and desire to secure by Letters Patent:

1. The arrangement of the plow-shanks F $F^2$ $F^3$, square shafts D H, adjustable clevises or arms E H', chains I' I', cog-wheels K L, and lever L', as and for the purpose described.

2. The arrangement of the shaft O, curved bar P, stirrups Q Q, vertical arm R, bar S, uprights S' S', curved bars V V, and pins $t$ $t$, as and for the purpose specified.

3. The reversible lever W, in combination with the shaft O and set-screw $w$, as described.

JAMES S. GILMORE.

Witnesses:
W. A. BRIDGFORD,
A. W. McLANE.